UNITED STATES PATENT OFFICE.

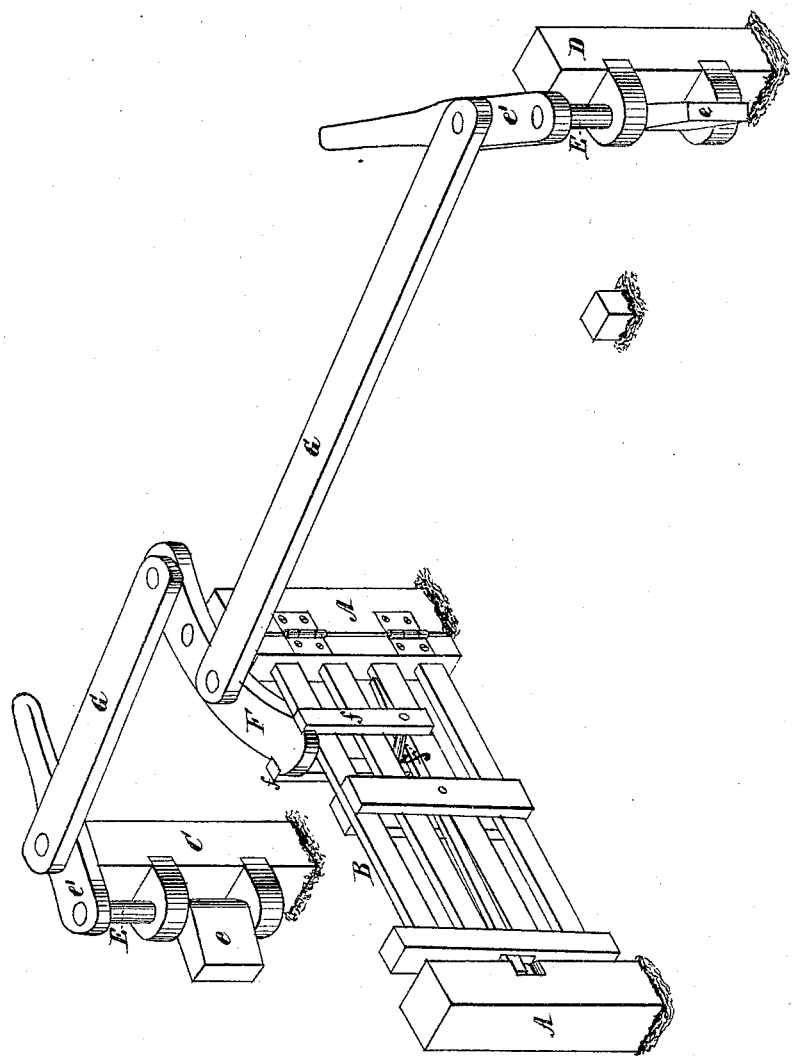

GEORGE C. CRUM, OF BARR'S STORE, ILLINOIS.

IMPROVEMENT IN AUTOMATIC GATES.

Specification forming part of Letters Patent No. 140,479, dated July 1, 1873; application filed May 14, 1873.

*To all whom it may concern:*

Be it known that I, GEORGE C. CRUM, of Barr's Store, in the county of Macoupin and State of Illinois, have invented a new and useful Improvement in Automatic Gates; and I do hereby declare the following to be a full, clear, and exact description of the same, reference being had to the accompanying drawing forming part of this specification.

The invention relates to that class of gates which are opened and closed automatically as the vehicles approach, and is subsequently closed behind them after their passage therethrough.

The invention will first be fully described in connection with all that is necessary to a full understanding thereof and then clearly pointed out in the claims.

The drawing is a perspective view of the gate with its various attachments.

A A represent posts, to one of which a gate, B, is hinged. C D are two posts, placed in line or nearly so with the hinge post of gate but on opposite sides thereof. Each of these posts C D is provided with two lugs, in which is journaled a shaft, E, having the arm $e$ at the lower and the arm $e'$ at the upper end, but each on an opposite side. F is a lever, fulcrumed on top of the hinge-post of gate, having two pendent arms, $f\,f$, which pass on either side of gate $j$, and is connected with the arms $e'$ by pivoted straps or pieces G G.

The operation is as follows: A vehicle approaching the gate is driven so that a hub thereof will catch against an arm, $e$. This will have the effect, as the carriage moves forward, of opening the gate in the direction traveled. After passing through the hub of vehicle is caused to strike the arm $e$ on the other post and turn the gate back into its original closed position.

This has been found practically to be operative and efficient, while it can be constructed at much less expense than the automatic openers now known to the public.

H is a stop, which limits the distance to which the gate may be opened. $f'$ is a cross-bar, which connects the lower ends of arms $f\,f$, and is inclined on its subjacent face so as to unlatch the gate at the first movement of the lever F.

Having thus described my invention, what I claim as new, and desire to secure by Letters Patent, is—

1. The vibratory lever F provided with arms $f\,f$, connected at the lower end by a cross-bar, $f'$, inclined on its subjacent face, and arranged to operate the latch of the gate, as and for the purpose described.

2. A lever, F, pivoted on top of post, and provided with arms $f\,f$ to turn the gate on its hinges, in combination with shafts E E having arms $e\,e'$ and connected with said lever by straps G G, as and for the purpose set forth.

GEORGE C. CRUM.

Witnesses:
    JAMES H. WOLFE,
    B. L. BERRY.